United States Patent [19]

Orain

[11] 3,817,057
[45] June 18, 1974

[54] PROTECTIVE ARRANGEMENT FOR A ROTARY POWER TRANSMISSION COUPLING

[75] Inventor: Michel Orain, Conflans-Sainte-Honorine, France

[73] Assignee: Societe Anonyme: Glaenzer Spicer, Poissy, France

[22] Filed: July 7, 1972

[21] Appl. No.: 269,528

[30] Foreign Application Priority Data
Feb. 18, 1972 France .............................. 72.05581

[52] U.S. Cl. .......................... 64/32 F, 64/8, 64/21
[51] Int. Cl. ................................................ F16d 3/84
[58] Field of Search ........ 64/32 F, 8, 9 A, 21, 32 R; 74/18.2, 18

[56] References Cited
UNITED STATES PATENTS

| | | | |
|---|---|---|---|
| 1,670,175 | 5/1928 | Wikoff | 64/32 R |
| 2,354,961 | 8/1944 | O'Donnell | 64/8 |
| 3,656,318 | 4/1972 | Smith et al. | 64/21 |

FOREIGN PATENTS OR APPLICATIONS

| | | | |
|---|---|---|---|
| 1,268,917 | 10/1959 | France | 64/8 |

Primary Examiner—Samuel Scott
Assistant Examiner—Randall Heald
Attorney, Agent, or Firm—Baldwin, Wight & Brown

[57] ABSTRACT

An insulative integral protective arrangement for a rotary power transmission system includes a sealing sleeve having its ends connected in fluid-tight manner to a shaft constituting the driving or driven element and to a generally annular sealing member disposed between this shaft and the other of the driving and driven members. The end which is connected to the generally annular member covers a relatively large area thereof and is squeezed against it by a casing which is not directly connected to the member. The casing provides the connection to the shaft to which the annular member is linked, and means are provided for forming a fluid-tight closure for the generally annular member in an extension of the corresponding end portion of the sleeve. The arrangement finds application in universal joints and in sliding couplings.

8 Claims, 8 Drawing Figures

PROTECTIVE ARRANGEMENT FOR A ROTARY POWER TRANSMISSION COUPLING

The present invention concerns mechanical couplings for transmitting power by rotation, such as homokinetic universal joints or sliding couplings, comprising a resilient envelope retaining the lubricant necessary to their operation and preventing the introduction of foreign bodies, particularly dust and mud, while ensuring all necessary liberty of movement to the mechanism.

Such couplings generally comprise driving and driven elements of which at least one consists of a shaft with a certain angular and/or axial mobility. Sealing members are disposed between these elements, at least one consisting of a generally annular member linked to the movement of the driving or driven element.

In such couplings the resilient envelope, which may be a sleeve or a bellows, is connected at its ends to the generally annular sealing member and to the shaft having a certain angular and/or axial mobility. The connection is made by means of flanges or other fluid-tight fixing means.

Such mechanical couplings, due to their rigidity, have the disadvantage that they transmit vibrations and noise caused by the source of the transmitted power, particularly when this source is an internal combustion engine. It is therefore necessary to include a resilient connection in series with the coupling to damp and reduce the propogation of vibration and noise.

The present invention is intended to provide for such mechanical couplings a sealing sleeve ensuring both damping of such vibration and noise and the further advantages including integral fluid-tightness, ease of assembly, elimination of leakage risks and a reduction in the cost price of the assembly.

In accordance with the present invention there is provided an insulative integral protective arrangement for a rotary power transmission system having driving and driven elements of which at least one is an angularly and/or axially displaceable shaft, sealing members of which at least one is generally annular being disposed between the elements, the protective arrangement including a sealing sleeve having its ends connected in fluid-tight manner to the shaft and the generally annular sealing member, being urged against the latter by a casing which is not in direct contact with the member and which includes means for attaching it to the driving or driven element, a fluid-tight closure for the generally annular member being formed in an extension of that end of the sealing sleeve which is urged against it.

In this manner, the sleeve acts as a noise and vibration damper between the driving and driven elements and, in combination with the fluid-tight closure, constitutes a sealed lubricant-retaining envelope which can be filled with lubricant before the coupling is installed in the mechanical system of which it constitutes a part.

The fluid-tight closure may include an extension of the sleeve itself, the sleeve then constituting a bag in which the seal members are enclosed. Alternatively, the fluid-tight closure may be a separate unit provided with a collar gripped between the generally annular sealing member and the casing, in the same manner as the corresponding end of the sleeve.

As another alternative, the closure may consist of an integral part of the casing and form the means of attaching the casing to the driving or driven element.

Various embodiments of the invention are shown in the accompanying drawings in which.

Figure 1:
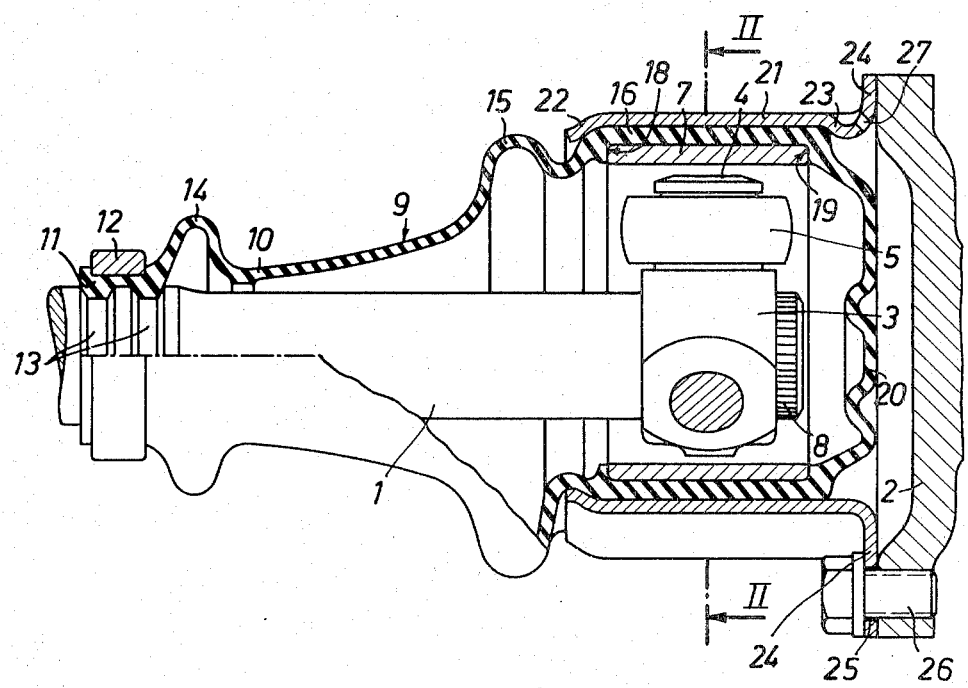
FIG. 1 is a longitudinal section of a homokinetic coupling provided with a first embodiment of an insulative protective arrangement.
Figure 2:
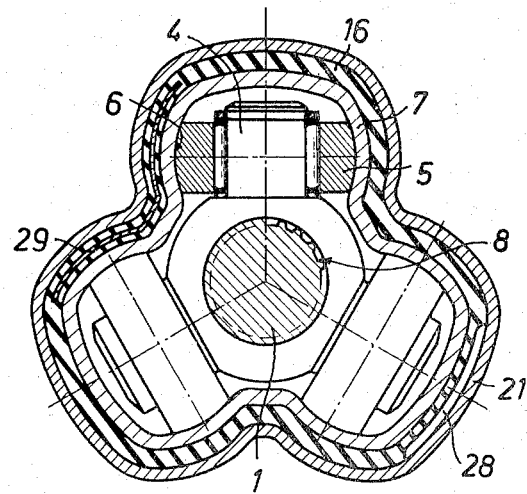
FIG. 2 is a section on the line II—II of FIG. 1.

Referring to FIGS. 1 and 2, a sliding homokinetic coupling connects a shaft 1 and a disc 2 rigidly connected to a second shaft (not shown) coaxial with the disc. The coupling includes an element 3 with three roller axes 4 extending radially and spaced from one another at 120°. Each carries a roller 5 engaging a rolling way 6 formed in a quenched steel shell 7. The element 3 is mounted on the shaft 1 on splines 8 machined on the end of the shaft.

The assembly comprising the element 3 and the shaft 7 is enclosed in a sealing envelope or sleeve indicated generally at 9. The sleeve 9 is suitably in natural or synthetic rubber or in any other suitable flexible and elastic or plastic material, for example an elastomer reinforced with cloth. The sleeve 9 includes a neck 10 the end 11 of which is pressed by a ring 12 against grooves 13 machined in the shelf 1. The neck 10 is also formed with folds 14 and 15 which allow it to deform as required during operation of the coupling. The neck 10 is extended by a skirt 16 surrounding the shell 7 which is axially located therein by abutment surfaces 18 and 19. The sleeve 9 is closed by a closure 20 to form a bag in which the coupling elements are enclosed.

The skirt 16 of the sleeve 9 is urged against the shell 7 by a metallic casing 21 of stamped metal, pressed in at 22 and 23 so that the pressure exerted by the skirt prevents rotation of the shell 7 with respect to the casing 21, whose profile follows that of the shell. The casing 21 is shaped to provide a flange 24 with holes 25 by means of which it is bolted to the disc 2, one of the bolts being shown at 26.

Since the sleeve 9 completely encloses the coupling, it may be filled with lubricant. Furthermore, it is not necessary to ensure fluid-tightness in the plane of the seal between the flange 24 and the disc 2.

A further advantage is that the elasticity of the closure 20 avoids excessive pressure changes within the sleeve 9 during the sliding movement of the coupling. A vent 27 in the casing 21 allows the closure 20 to freely reach its equilibrium position.

The sleeve 9 provides a damped elastic connection between the shell 7 and the casing 21 and, consequently, between the shaft 1 and the disc 2, by means of the skirt 16 located between the shell and the casing.

The shell 7 may be inserted into the sleeve 9 either during its moulding, the shell being placed in a suitable manner in the mould, or after moulding by stretching the end portion 11 of the neck 10, through which the shell 7 is introduced. The element 3 can be introduced into the sleeve 9 in the same manner, passing through the open end 11.

The casing 21 may be placed around the skirt 16 of the sleeve 9 either during the moulding operation or as a final step in assembly. In the latter case it is first placed over the skirt 16 and then radially crimped.

If required the skirt 16 of the sleeve 9 may be provided with recesses, of which one is shown at 28 in FIG. 2, to increase the flexibility of the elastic coupling between the shell 7 and the casing 21, without reducing the torque transmission capacity. This also facilitates introduction of the shell 7 when this is carried out after moulding of the sleeve. Further, the skirt 16 may be provided during its moulding with thin metal sheet inserts 29 one of which is shown in FIG. 2. These are intended to increase the torque transmission capacity of the skirt without materially reducing its elasticity.

Figure 3:
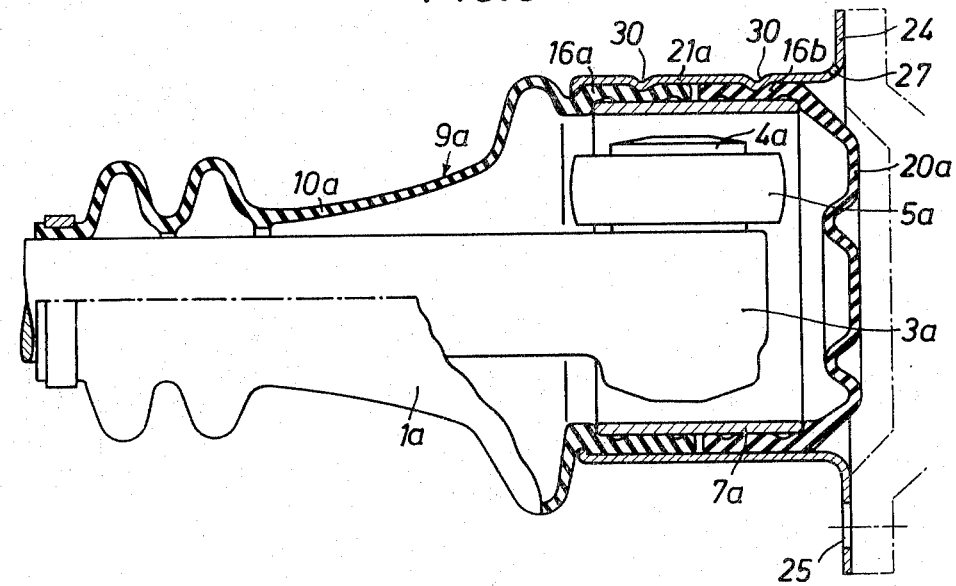
FIG. 3 is a similar view to FIG. 1 of a coupling of the same type provided with a second embodiment of the protective arrangement.

FIG. 3 shows a coupling of the same type as FIGS. 1 and 2 but in which the axles 4a carrying the rollers 5a are on an element 3a integral with the shaft 1a. To facilitate assembly the sleeve 9a is in two parts and its skirt which surrounds the shell 7a is divided into a portion 16a which is a continuation of the neck 10a and a part 16b closed by the fluid-tight flexible closure 20a. The casing 21a is squeezed against the skirt portion 16a and 16b by inwardly-facing projections 30 in the casing 21a.

Figure 4:
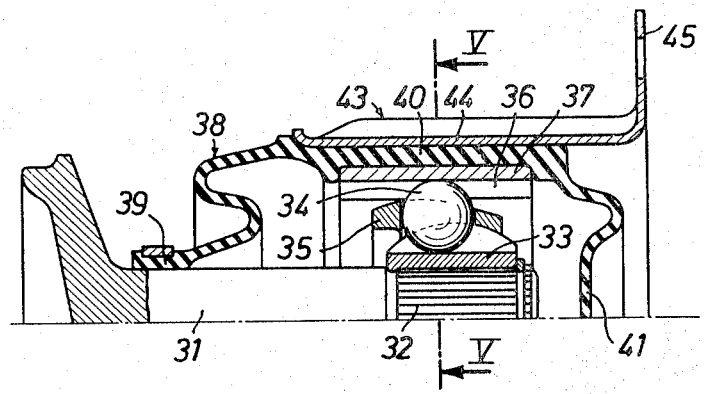
FIG. 4 is a longitudinal section of a homokinetic sliding coupling provided with a third form of protective arrangement.
Figure 5:
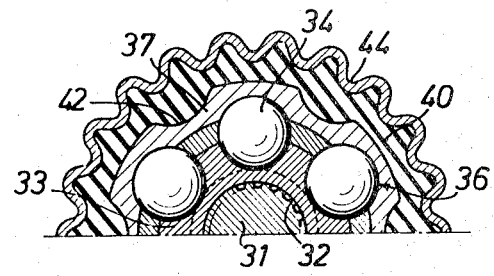
FIG. 5 is a section on the line V—V in FIG. 4.

FIGS. 4 and 5 show a sliding homokinetic coupling using ball bearings. On a shaft 31 having splines 32 is force-fitted a ring 33 carrying ball bearing 34 located by a ring 35 and engaging rolling ways 36 formed in a shell 37 preferably of quenched steel. The sealing sleeve 38 is gripped to the shaft 31 at 39. It comprises a skirt 40 which grips the shell 37 in a manner analogous to that which has been described with reference to FIGS. 1 and 2. The skirt 40 is closed, opposite its neck 39, by a flexible closure 41 similar to the closure 20 of FIGS. 1 and 2. The shell 37 comprises grooves 42 into which the skirt 40 is pressed by the casing 43 which is corrugated as shown at 44, the casing comprising a flange 45 for connection to a disc such as that shown in FIGS. 1 and 2.

The casing 43 is radially crimped during assembly of the coupling to compress the skirt 40 to provide an effective seal without impairing the elasticity and the damping properties of the skirt, which is suitably of natural or synthetic rubber.

Figure 6:
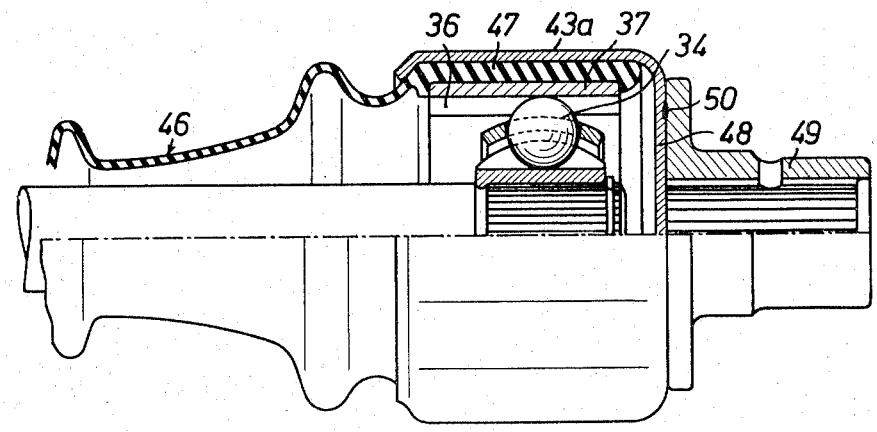
FIG. 6 is a part-sectional elevation of another protective arrangement on a coupling of the same type as that shown in FIG. 4.

FIG. 6 shows the same type of coupling provided with a sleeve 46 whose skirt 47 is gripped between the casing 43a and the shell 37 which carries the rolling ways 36 of the balls 34. This sleeve has no end closure, however, fluid-tightness being ensured by the end wall 48 of the casing. The splined sleeve 49 is welded to this end wall 48 by spot welds 50, for connection of the casing to a transmission shaft (not shown).

Figure 7:
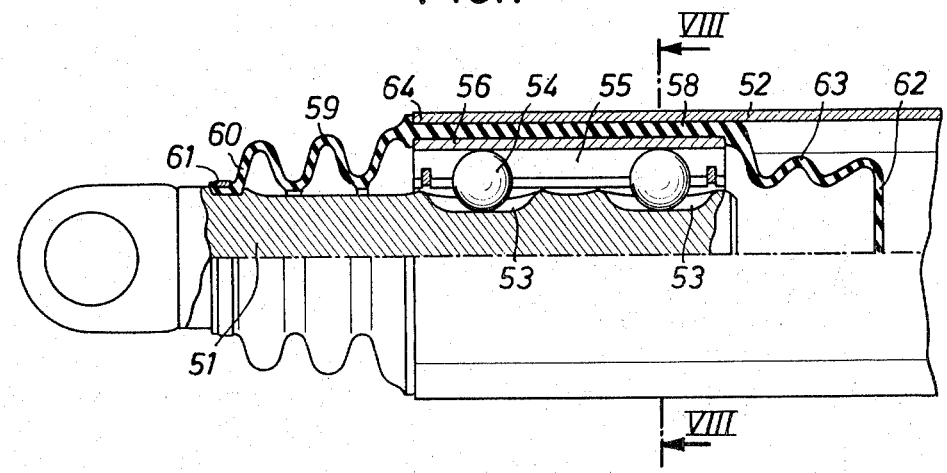
FIG. 7 is a partial longitudinal section of a sliding coupling provided with a protective arrangement.
Figure 8:
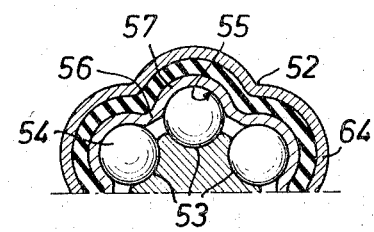
FIG. 8 is a section on the line VIII—VIII of FIG. 7.

FIGS. 7 and 8 show a sliding coupling providing a connection between a plunger 51 and a further transmission element (not shown) rigidly connected to a tubular casing 52. The plunger 51 is formed with grooves 53 in which balls 54 are axially displaceable, these balls engaging rolling ways 55 in a shell 56. The shell is resiliently coupled to the casing 52 by the skirt 58 of a sealing sleeve 59 the neck 60 of which is gripped between the plunger 51 and a ring 61. The other end of the sleeve is closed by an end closure 62, folds 63 allowing for a change in volume of the sleeve during axial movements of the plunger.

The casing 52 has a lobed profiled 64 which follows that 57 of the shell 56 to permit rotational coupling without impairing the elasticity and damping properties of the coupling. The arrangements of the skirt of the sealing sleeve just described permit the damping of vibrations in mechanical couplings and consequently the isolation of noise. The cost of mass producing the couplings is significantly reduced due to the simplicity of assembling its components parts and the ease of manufacture of the operative elements. The shell of hard steel may be very short and cut from a section while the casing may consist of a simple stamped sheet.

A very good sealing effect is achieved and internal overpressures and underpressures are avoided. The assembly of the couplings will generally be very easy on a mass production chain, filling with lubricant being carried out before hand.

Various modifications can be made to the devices described above. For example, when the shell comprises a flange, this may be rivetted or welded to the transmission disc or analogous element, instead of being bolted thereto as in the above description. Also, in the arrangement shown in FIG. 6, the casing may be provided with a peripheral flange for attachment to the corresponding driving or driven element. Furthermore the skirt of the sealing sleeve may be made adherent to the casing and/or the shell by any suitable known means.

What is claimed is:

1. In a rotary power transmission device comprising drive members including a driving member and a driven member, at least one of said drive members being angularly and axially displaceable relative to the other of said drive members, a first rigid sleeve member, said other drive member having an extension projecting into said first rigid sleeve member through one end thereof, cooperating means on said extension and said first rigid sleeve member for transmitting a torque between said extension and said first rigid sleeve member, liquid impervious protecting means in the form of an elongated sealing sleeve formed of a resilient material telescoped over said first rigid sleeve member and said extension, means securing one end portion of said sealing sleeve to said other drive member in sealed engagement, a second rigid sleeve member rotatingly and axially connected to said one drive member, coupling means coupling said first rigid sleeve member to said second rigid sleeve member with said first rigid sleeve member being free of direct contact with both said one drive member and said second rigid sleeve member, said coupling means including an annular portion of said sealing sleeve extending axially between said first and second rigid sleeve members in radially compressed driving relation, and fluid tight closure means closing the other end of said first rigid sleeve member, said fluid tight closure means including a cup-shaped member made of a resilient material and having a continuous side wall which extends between said first and second rigid sleeve members and is compressively held therebetween, said first and second rigid sleeve members being both provided with longitudinally extending alternating grooves and ribs, and both said sealing sleeve and said cup shaped member having portions of varying radial thickness corresponding to said alternating ribs and grooves.

2. A rotary transmission device as claimed in claim 1 wherein said sealing sleeve and said cup-shaped member form a single one-piece bag-like member having a closed end, an open end and a wall portion extending therebetween, said closed end forming said fluid tight closure means with said wall portion, said wall portion extending entirely axially between and beyond said first and second rigid sleeve members, and said bag-like member open end being that one end portion which is secured to said other drive member in sealed relation.

3. A rotary transmission device as claimed in claim 2 wherein said bag-like member closed end is readily deformable to accommodate changes in volume in said bag-like member in response to relative movement between said drive members.

4. In a rotary power transmission device comprising drive members including a driving member and a driven member, at least one of said drive members being angularly and axially displaceable relative to the other of said drive members, a first rigid sleeve member, said other drive member having an extension projecting into said first rigid sleeve member through one end thereof, cooperating means on said extension and said first rigid sleeve member for transmitting a torque between said extension and said first rigid sleeve member, liquid impervious protecting means in the form of an elongated sealing sleeve formed of a resilient material telescoped over said first rigid sleeve member and said extension, means securing one end portion of said sealing sleeve to said other drive member in sealed engagement, a second rigid sleeve member rotatingly and axially connected to said one drive member, coupling means coupling said first rigid sleeve member to said second rigid sleeve member with said first rigid sleeve member being free of direct contact with both said one drive member and said second rigid sleeve member, said coupling means including an annular portion of said sealing sleeve extending axially between said first and second rigid sleeve members in radially compressed driving relation, and fluid tight closure means closing the other end of said first rigid sleeve member, said sealing sleeve and said cup-shaped member forming a single one-piece member having a closed end, an open end and a wall portion extending therebetween, said closed end forming said fluid tight closure means with said wall portion, said wall portion extending entirely axially between and beyond said first and second rigid sleeve members, and said bag-like member open end being that one end portion which is secured to said other drive member in sealed relation, said first and second rigid sleeve members both having longitudinally extending alternating grooves and ribs.

5. A rotary transmission device as claimed in claim 4, wherein said longitudinally extending alternating grooves and ribs of said second rigid sleeve member are in the form of longitudinally extending corrugations.

6. A rotary transmission device as claimed in claim 4 wherein said longitudinally extending alternating grooves and ribs of said first and second rigid sleeve members are longitudinally extending, mutually corresponding corrugations.

7. A rotary transmission device as claimed in claim 1, wherein said longitudinally extending alternating grooves and ribs of said second rigid sleeve member are in the form of longitudinally extending corrugations.

8. A rotary transmission device as claimed in claim 1 wherein said longitudinally extending alternating grooves and ribs of said first and second rigid sleeve members are longitudinally extending, mutually corresponding corrugations.

* * * * *